United States Patent [19]
Greber et al.

[11] 3,926,911
[45] Dec. 16, 1975

[54] CROSSLINKED POLYMERS CONTAINING SILOXANE GROUPS

[75] Inventors: Gerd Greber, Binningen; Roland Darms, Therwil; Dieter Lohmann, Pratteln, all of Switzerland

[73] Assignee: Ciba-Geigy Corporation, Ardsley, N.Y.

[22] Filed: May 24, 1974

[21] Appl. No.: 473,047

[30] Foreign Application Priority Data
June 7, 1973 Switzerland............... 8259/73
Aug. 2, 1973 Switzerland............... 11230/73

[52] U.S. Cl.... 260/46.5 E; 260/46.5 G; 260/47 CP; 260/78 TF; 260/824 R
[51] Int. Cl.² ............... C08G 77/04; C08G 77/26
[58] Field of Search ....... 260/46.5 E, 78 TF, 47 CP, 260/824 R, 46.5 G

[56] References Cited
UNITED STATES PATENTS
3,288,754 11/1966 Green............................ 260/46.5 E
3,779,990 12/1973 Greber et al.................... 260/47 CP Primary Examiner—Melvyn I. Marquis
Attorney, Agent, or Firm—Luther A. R. Hall

[57] ABSTRACT

New crosslinked polyamides, polyimides and polyamide-imides containing siloxane groups are described, which can be manufactured by heating silicon-modified polyamide, polyamide-acid and polyamide-amide-acid prepolymers to temperatures of between 50° and 350°C. These crosslinked polymers containing siloxane groups are distinguished by good mechanical, electrical and thermal properties.

12 Claims, No Drawings

CROSSLINKED POLYMERS CONTAINING SILOXANE GROUPS

The present invention relates to new crosslinked polyamides, polyimides and polyamide-imides containing siloxane groups, a process for their manufacture and their use as industrial products.

It has been found that new crosslinked polyamides, polyimides and polyamide-imides, containing from 0.1 to 17.0 percent by weight of silicon and exhibiting improved properties can be obtained when silicon-modified polyamide, polyamide-acid or polyamide-amide-acid prepolymers with an inherent viscosity of 0.04 to 4.0, which have the formula I

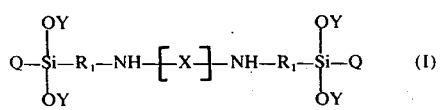

wherein X represents a structural element of the formula II

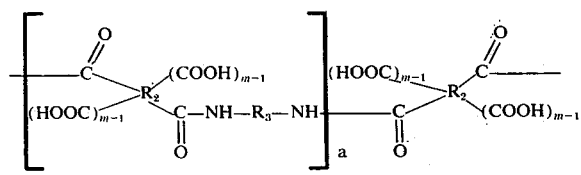

a denotes a number from 0 to 100, especially 0 to 60, and the individual m, $R_1$, $R_2$, $R_3$, Q and Y independently of one another denote the following: m denotes the number 1 or 2, $R_1$ denotes a radical

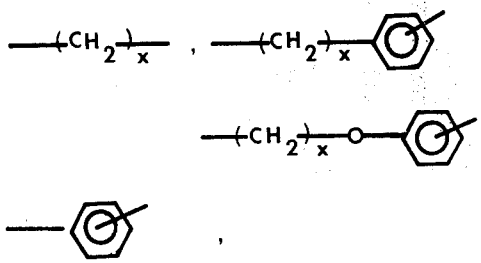

with x denoting a number from 1 to 4, $R_2$ denotes a carbocyclic-aromatic or heterocyclic radical, wherein the carbonamide and carboxyl groups are bonded to different ring carbon atoms and the carboxyl groups are each in the ortho-position to a carbonamide group, $R_3$ denotes an aliphatic radical with at least 2 carbon atoms, or a cycloaliphatic, araliphatic, carbocyclic-aromatic or heterocyclic radical, Q denotes methyl, phenyl or an-OY radical, with Y having the meaning indicated below, and Y denotes an alkyl radical with 1 to 6 carbon atoms or a phenyl radical, or corresponding cyclised derivatives, are heated to temperatures between 50° and 350°C.

Heating to temperatures between 150° and 225°C is preferred.

Silicone-modified polyamide, polyamide-acid and polyamide-amide-acid prepolymers which can be used according to the invention preferably have an inherent viscosity of 0.07 to 2.5.

The inherent viscosity $\eta_{inh.}$ is calculated from the following equation:

$$\eta_{inh.} = \frac{\ln \frac{\eta}{\eta_o}}{c}$$

In this equation, the symbols having the following meaning: ln = natural logarithm, $\eta$ = viscosity of the solution (0.5 percent by weight of the polymer in a suitable solvent, for example, N,N-dimethylacetamide, N,N-dimethylformamide or N-methylpyrrolidone), $\eta_o$ = viscosity of the solvent and c = concentration of the polymer solution in g of polymer/100 ml of solvent.

The viscosity measurements are carried out at 25°C. As is generally known, the inherent viscosity represents a measure of the molecular weight of a polymer. The quoted values of $\eta_{inh.} = 0.04$ to 4.0 correspond to average molecular weights of about 400 to 50,000. The average molecular weights can be determined by methods which are in themselves known, for example by means of light scattering.

Prepolymers according to the definition, with structural elements X of the formula II, wherein a ≥ 1 and the individual m, $R_2$ and/or $R_3$ can have different meanings, can be homopolymers or copolymers with a statistical distribution or with any desired at least partially block-like arrangement of polyamide, polyamide-acid and/or polyamide-amide-acid units according to the invention in the structural element X, and can be, for example, homopolymers or block copolymers with terminal acid groups.

Thus, prepolymers of the formula I inter alia also comprise prepolymers wherein the structural element X can be represented by the formula IIa

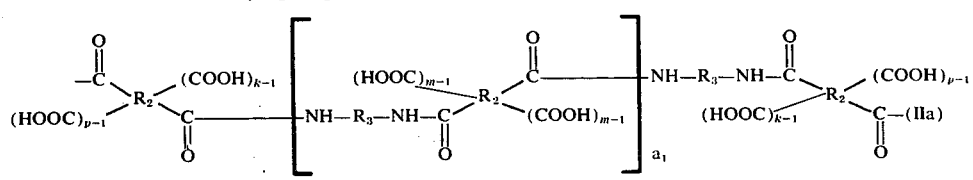

wherein $a_1$ denotes a number from 0 to 99 and k and p independently of one another denote the number 1 or 2 and what has been stated under the formula I applies to $R_1$, $R_2$, $R_3$, m, Q and Y, and the corresponding cyclised derivatives.

Silicon-modified prepolymers of the formula I which can be used according to the invention, and wherein X represents a structural element of the formula II or IIa, and corresponding cyclised derivatives, can be manufactured by reacting, if a = 0, dicarboxylic acid dichlorides of the formula

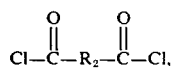

tricarboxylic acid anhydride chlorides of the formula

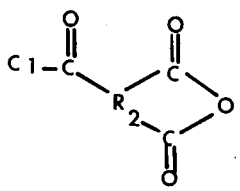

or tetracarboxylic acid dianhydrides of the formula

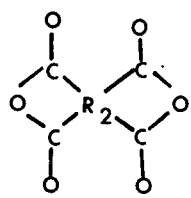

or, if a ≥ 1, polyamides or polyamide-amide-acids with 2 acid chloride end groups, polyamide-acids or polyamide-amide-acids with 2 anhydride end groups or polyamide-amide-acids with one acid chloride and one anhydride end group, all these - apart from said end groups - corresponding to the formula II, or corresponding cyclised derivatives, with at least 2 mols of an aminosilane of the formula III

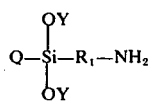

wherein what has been stated under the formula I applies to a, m, $R_1$, $R_2$, $R_3$, Q and Y, and optionally subsequently chemically cyclising silicon-modified polyamide-acid or polyamide-amideacid prepolymers.

Silicon-modified prepolymers which can be used according to the invention, of the formula I, wherein X represents a structural element of the formula IIa and k = 2, can also be obtained according to a modified process by reacting at least 2 mols of a compound of the formula IV

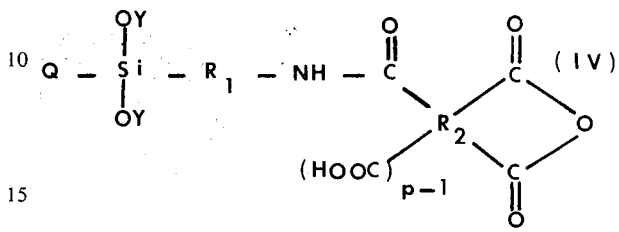

wherein p is the number of 1 or 2, the radical -COOH is in the ortho-position to the grouping -CO-NH-$R_1$- and the anhydride grouping is bonded to adjoining C atoms of the radical $R_2$, with a diamine of the formula $H_2N$-$R_3$-$NH_2$, if $a_1$ = 0, or a polyamide, a polyamide-acid or a polyamide-amide-acid, if $a_1 \geq 1$, of the formula V

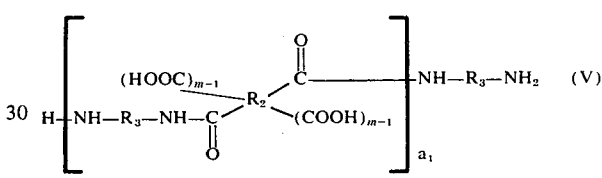

or corresponding cyclised derivatives, cyclised derivatives, with the statements under formula I or IIa applying to $a_1$, m, p, $R_1$, $R_2$, $R_3$, Q and Y, and optionally subsequently chemically cyclising slicon-modified polyamide-acid or polyamide-amide-acid prepolymers.

If $R_2$ represents a carbocyclic-aromatic radical, the latter preferably has at least one 6-membered ring; in particular, these are monocylic radicals, fused polycyclic radicals or polycyclic radicals with several cyclic, fused or non-fused systems, which can be linked to one another direct or via bridge members.

As examples of suitable bridge members there may be mentioned:

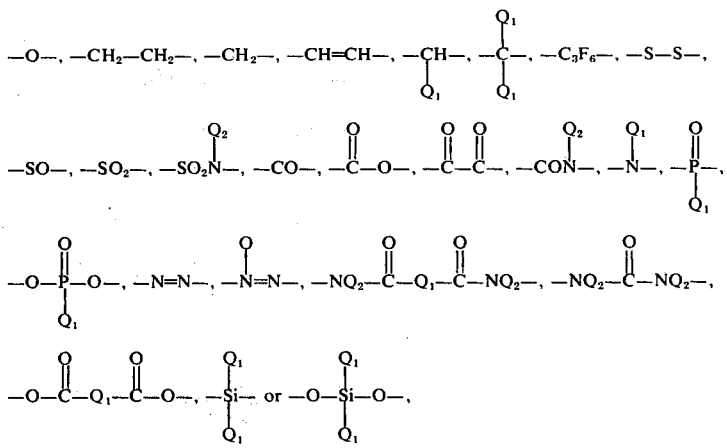

wherein $Q_1$ represents an alkyl or alkylene radical with 1 to 6, preferably 1 to 4, carbon atoms, which can optionally by substituted by halogen atoms, preferably fluorine, or a cycloalkyl, aryl or arylene radical and $Q_2$ represents hydrogen, an alkyl radical with 1 to 4 carbon atoms, which can optionally be substituted by halogen atoms, a cycloalkyl radical or an aryl radical. Such radicals can also be bonded to one another via two bridge members, such as two -$SO_2$- groups.

If $R_2$ denotes a heterocyclic radical, it can in particular be a 5-membered or 6-membered heterocyclic-aromatic, optionally benzo-condensed ring systems containing O, N and/or S.

Carboxylic-aromatic or heterocyclic radicals represented by $R_2$ can also be substituted, for example by nitro groups, alkyl groups with 1 to 4 carbon atoms, trifluoromethyl groups, halogen atoms, especially fluorine, silyl groups or sulphamoyl groups.

Radicals represented by $R_3$ can be substituted or substituted, for example by halogen atoms, such as fluorine, chlorine or bromine, or by alkyl or alkoxy groups each with 1 to 4 carbon atoms.

If $R_3$ represents a carbocyclic-aromatic radical, polycyclic is preferably a monocyclic, fused polycycli or non-fused bicyclic aromatic radical, and in the latter case the aromatic nuclei are bonded to one another via a bridge member. Possible bridge members are the groups mentioned previously when discussing $R_2$. If $R_3$ denotes a heterocyclic radical, it is in particular a heterocyclic-aromatic 5-membered or 6-membered ring containing O, N and/or S.

Possible aliphatic radicals $R_3$ are above all alkylene radicals with 2 to 12 carbon atoms, and the alkylene chain can also be interrupted by hetero-atoms, such as O, S or N atoms.

If $R_3$ denotes a cycloaliphatic radical it represents, for example, the cyclohexyl or dicyclohexylmethane radical, whilst possible araliphatic radicals are above all, 1,3-, 1,4- or 2,4-bis-alkylenebenzene, 4,4'-bis-alkylene-diphenyl and 4,4'-bis-alkylene-diphenyl-ether radicals.

Preferably, the individual $R_2$ independently of one another represent an unsubstituted monocyclic, fused polycyclic or non-fused bicyclic aromatic radical, the aromatic nuclei in the latter case being bonded to one another via the bridge member -O- or -CO-, whilst the individual $R_3$ preferably independently of one another denote a monocyclic or non-fused bicyclic aromatic radical which is optionally substituted by halogen atoms or alkyl or alkoxy groups with 1 to 4 carbon atoms each, an unsubstituted monocyclic araliphatic radical or an unsubstituted aliphatic radical possessing 2 to 10 carbon atoms.

Particularly preferentially, $R_2$ represents the 1,4- or 1,3-phenylene radical or a benzene ring or the benzophenone ring system and $R_3$ represents the 1,4- or 1,3-phenylene radical, the 4,4'-diphenylyl-ether radical or the 4,4'-diphenylylmethane radical, but of $R_2$ and $R_3$ only one denotes a 1,4-phenylene radical.

The following may be mentioned as examples of alkyl radicals with 1 to 6 carbon atoms which Y represents: methyl, ethyl, n-propyl, iso-propyl, n-butyl, tert.-butyl, n-pentyl and n-hexyl radicals. Preferably, the individual Y represent an ethyl or propyl radical, especially the n-propyl radical, whilst Q, if Y = ethyl, preferably denotes the ethoxy group and, if Y = propyl, denotes the methyl group.

In general, if a or $a_1$ > 1, prepolymers of the formula I with structural elements of the formula II or IIa, wherein the individual $R_2$ and $R_3$ have the same meaning, k, m and p are the same for each radical $R_2$, and what has been stated under the formula I applies to $R_1$, Q and Y, and the corresponding cyclised derivatives, are preferred.

According to a further preference, prepolymers of the formula I are used wherein X represents a structural element of the formula IIb

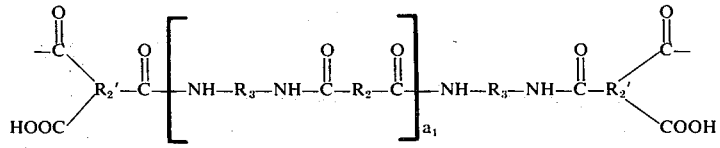

in which $a_1$ denotes a number from 1 to 99 and the two $R_2'$ each represent a benzene ring, with the carbonamide and carboxyl groups being bonded to different ring carbon atoms and the carboxyl groups each being in the ortho-position to the -CO-NH-$R_1$- grouping, and the individual $R_1$, $R_2$, $R_3$, Q and Y are identical, or corresponding derivatives with cyclised terminal carboxylic acid groups, and prepolymers of the formula I wherein X represents a structural element of the formula IIc

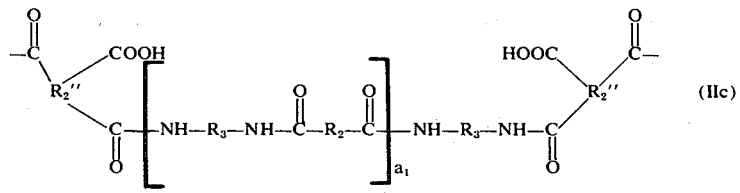

in which $a_1$ denotes a number from 1 to 99 and the two $R_2''$ each denote a benzene ring, with the carbonamide groups and carboxyl groups being bonded to different ring carbon atoms and the carboxyl groups being each in the ortho-position to the -CO-HN-$R_3$- grouping, and the individual $R_1$, $R_2$, $R_3$, Q and Y are identical, or corresponding derivatives with cyclised terminal carboxylic acid groups.

The use of the following silicon-modified prepolymers is particularly preferred:

Prepolymers of the formula I, wherein X represents a structural element of the formula II with m in each case = 1, or denotes a structural element of the formula IIb, $R_1$ in each case denotes a

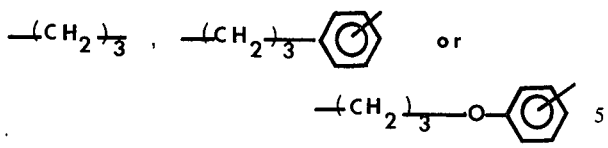

radical, the individual R₂ and R₃ are respectively identical and one of R₂ and R₃ represents the 1,4-phenylene radical and the other the 1,3-phenylene radical or R₂ and R₃ each represents the 1,3-phenylene radical, Q represents the methyl group and Y represents a propyl group, or Q represents the ethoxy group and Y the ethyl group, and what has been stated under the formula II or IIb applies to a, a₁ and R₂', or corresponding derivatives with cyclised terminal carboxylic acid groups;

prepolymers of the formula I, wherein X denotes a structural element of the formula II with m = 2 in each case, R₁ in each case represents a

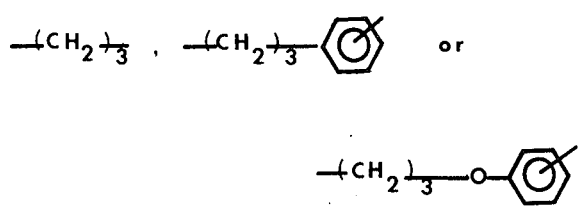

radical, R₂ in each case denotes a benzene ring or the benzophenone ring system, R₃ in each case denotes the 4,4'-diphenylyl-ether or the 4,4'-diphenylylmethane radical, Q denotes the methyl group and Y denotes a propyl group or Q denotes the ethoxy group and Y the ethyl group and a has the indicated meaning, or corresponding cyclised derivatives;

prepolymers of the formula I, wherein X represents a structural element of the formula IId

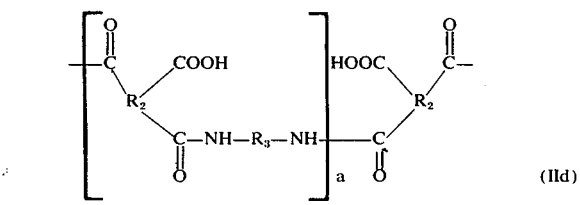

in which R₁ in each case represents a

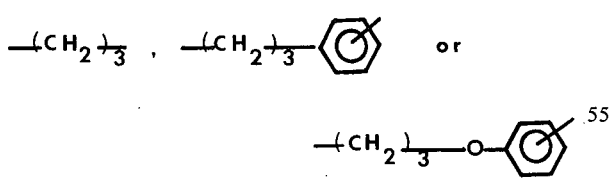

radical, R₂ in each case represents a benene ring and R₃ in each case represents the 4,4'-diphenylylether or the 4,4'-diphenylylmethane radocal, Q denotes the methyl group and Y denotes a propyl group or Q denotes the ethoxy group and Y denotes the ethyl group and a has the indicated meaning, or corresponding cyclised derivatives; and prepolymers of the formula I, wherein X represents a structural element of the formula IIc, R₁ in each case represents a

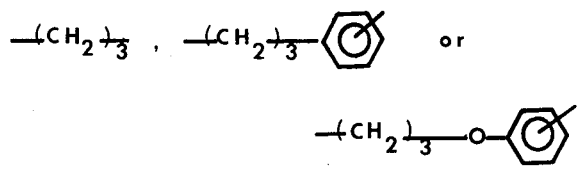

radical, the individual R₂ and R₃ are respectively identical and one of R₂ and R₃ denotes the 1,4-phenylene radical and the other the 1,3-phenylene radical or R₂ and R₃ each denote the 1,3-phenylene radical, Q denotes the methyl group and Y denotes a propyl group or Q denotes the ethoxy group and Y the ethyl group and a₁ and R₂'' have the indicated meaning, or corresponding derivatives with cyclised terminal carboxylic acid groups.

The starting products which can be used for the manufacture of the prepolymers are in themselves known or can be manufactured according to processes which are in themselves known.

Examples of dicarboxylic acid dichlorides of the formula

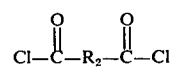

which can be used are thiophene-2,5-dicarboxylic acid dichloride and terephthalic acid dichloride, but above all isophthalic acid dichloride.

As a tricarboxylic acid anhydride-chloride of the formula

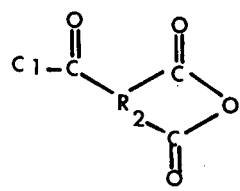

it is in particular possible to use trimellitic acid 1,2-anhydride-chloride (1,3-dioxo-benzo[c]oxalane-5-carboxylic acid chloride).

Examples of tetracarboxylic acid dianhydrides of the formula

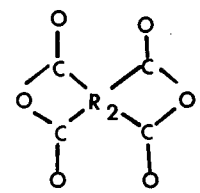

which can be used are pyromellitic acid dianhydride, 3,3',4,4'-benzophenone-tetracarboxylic acid dianhydride, 2,3,3',4'-benzophenone-tetracarboxylic acid dianhydride, 2,2',3,3'-benzophenone-tetracarboxylic acid dianhydride, 3,3',4,4'-diphenyltetracarboxylic acid dianhydride, 2,2',3,3'-diphenyl-tetracarboxylic acid dianhydride, bis-(2,3-dicarboxyphenyl)-methane diahydride, bis-(3,4-dicarboxyphenyl)-methane dianhydride, 2,2-bis-(2,3-dicarboxyphenyl)-propane dianhydride, bis-(3,4-dicarboxyphenyl)-ether dianhydride, bis-(3,4-dicarboxyphenyl)-sulphone dianhydride, N,N-(3,4-dicarboxyphenyl)-N-methylamine dianhydride, 3,3',4,4'-tetracarboxybenzoyloxybenzene dianhydride, 2,3,6,7-naphthalene-tetracarboxylic acid dianhydride, 1,2,5,6-naphthalene-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride.

Instead of the abovementioned dianhydrides it is also possible to employ corresponding tetracarboxylic acid diesterdihalides, tetracarboxylic acid diester-diamides, tetracarboxylic acid diamide-dihalides, tetracarboxylic acid diesters or tetracarboxylic acid tetraesters.

Polyamides or polyamide-amide-acids with 2 acid chloride end groups, polyamide-acids or polyamide-amide-acids with 2 end groups or polyamide-amide-acids with one acid chloride end group and one anhydride en group (a ≥ 1), which - apart from said end groups - correspond to the formula II, can be manufactured by reacting an excess of suitable carboxylic acid derivatives, that is to say dicarboxylic acid dichlorides, tricarboxylic acid anhydridechlorides or tetracarboxylic acid dianhydrides of the abovementioned formulae with one or more diamines of the formula $H_2N-R_3-NH_2$. If at the same time different carboxylic acid derivatives are employed, in a total excess over the diamine, copolymers corresponding to the formula II are obtained which have identical or different terminal acid groups and a statistical distribution of the polyamide, polyamide-acid and/or polyamide-amide-acid units. If, on the other hand, a single carboxylic acid derivative is used, in excess over the diamine, homopolymers with terminal acid groups are obtained, in which the terminal acid groups can, when using a tricarboxylic acid anhydride-chloride, also be different, depending on the type of linking.

Instead of triacarboxylic acid anhydride-chlorides it is also possible, in the case of a ≥ 2, to employ tricarboxylic acid derivatives of the formula

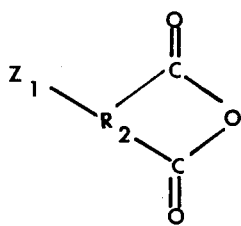

wherein $Z_1$ denotes a -COO-alkyl radical with 1–5 carbon atoms in the alkyl group, a -COO-aryl or -COOH radical and the corresponding salts, such as alkali metal salts or ammonium salts or salts with tertiary bases. As examples there may be mentioned: trimellitic acid anhydride, the Na salt of trimellitic acid anhydride, the ammonium salt of trimellitic acid anhydride, trimellitic acid anhydride monomethyl, monoethyl, monoisopropyl, mono-sec.-butyl or mono-tert.-butyl and monoisopentyl ester and trimellitic acid anhydride benzoic acid ester.

In these cases, a prepolymer possessing amino end groups is first prepared by reaction of a tricarboxylic acid derivative of this type with an excess of a diamine according to the definition, after which the prepolymer is allowed to react with at least 2 mols of a dicarboxylic acid dichloride, tricarboxylic acid anhydride-chloride or tetracarboxylic acid dianhydride.

Polymers corresponding to the formula IIb and having terminal acid groups can be manufactured analogously by allowing a homopolymer, copolymer or block copolymer possessing amino end groups, for example a polyamide homopolymer, to react with at least 2 mols of another carboxylic acid derivative, for example a tricarboxylic acid anhydride-chloride, such as trimellitic acid 1,2-anhydride-chloride.

Block copolymers with terminal acid groups can be obtained by reacting an excess of one or more copolymers or homopolymers with terminal acid groups, prepared in the manner described above, with homopolymers or copolymers possessing amino end groups.

Finally, starting products corresponding to the formula II, having terminal acid groups and a partially block-like arrangement of polyamide, polyamide-acid and/or polyamide-amide-acid units, can be prepared, for example, by reacting an excess of a homopolymer possessing terminal acid groups with a diamine according to the definition.

Polymers of the formula V possessing amino end groups can be manufactured analogously by employing the diamine or diamines or the polymers with terminal amino groups in excess over the carboxylic acid derivatives or the polymers possessing terminal acid groups.

Polyamide-acid or polyamide-amide-acid polymers thus obtained can, if desired, by cyclised thermally or chemically, by methods which are in themselves known, before the reaction with the aminosilanes of the formula III or the compounds of the formula IV.

Preferred dicarboxylic acid derivatives, tricarboxylic acid derivatives or tetracarboxylic acid derivatives for the above reactions are isophthalic acid dichloride, trimellitic acid anhydride, trimellitic acid 1,2-anhydride-chloride, pyromellitic acid dianhydride and benzophenonetetracarboxylic acid dianhydride.

Compounds which are in themselves known can be used as the diamines of the formula $H_2N-R_3-NH_2$.

The following may be mentioned as specific examples of carbocyclic-aromatic diamines: o—, m— and p-phenylenediamine, diaminotoluenes, such as 2,4-diaminotoluene, 1,4-diamino-2-methoxybenzene, 2,5-diaminoxylene, 1,3-diamino-4-chlorobenzene, 1,4-diamino-2,5-dichlorobenzene, 1,4-diamino-2-bromobenzene, 1,3-diamino-4-isopropylbenzene, N,N'-diphenyl-1,4-phenylenediamine, 4,4'-diaminodiphenyl-2,2-propane, 4,4'-diaminodiphenylmethane, 2,2'- or 4,4'-diaminostilbene, 4,4'-diaminodiphenyl-ether, 4,4'-diaminodiphenyl-thioether, 4,4'-diaminodiphenylsulphone, 3,3'-diaminodiphenylsulphone, 4,4'-diaminobenzoic acid phenyl ester, 2,2'- or 4,4'-diaminobenzophenone, 4,4'-diaminobenzil, 4-(4'-aminophenylcarbamoyl)-aniline, bis-(4-aminophenyl)-phosphine oxide, bis-(4-aminophenyl)-methylphosphine oxide, bis-(3-aminophenyl)-methylphosphine oxide, bis-(4-aminophenyl)-phenylphosphine oxide, bis-(4-aminophenyl)-cyclohexylphosphine oxide, N,N-bis-(4-aminophenyl)-N-phenylamine, N,N-bis-(4-aminophenyl)-N-methylamine, 4,4'-diaminodiphenylurea, 1,8- or 1,5-diaminonaphthalene, 1,5-diaminoanthraquinone, diaminofluoranthene, bis-(4-aminophenyl)-diethylsilane, bis-(4-aminophenyl)-dimethylsilane and bis-(4-aminophenyl)-tetramethyl-disiloxane.

Particularly preferred compounds are 1,4- and above all 1,3-phenylenediamine, 4,4'-diaminodiphenyl ether and 4,4'-diaminodiphenyl-methane.

Examples of heterocyclic diamines are: 2,6-diaminopyridine, 2,4-diaminopyrimidine, 2,4-diamino-s-triazine, 2,7-diamino-dibenzofurane, 2,7-diaminocarbazole, 3,7-diaminophenothiazine and 2,5-diamino-1,3,4-thiadiazole.

As aliphatic diamines there may be mentioned: dimethylenediamine, trimethylenediamine, tetramethylenediamine, hexamethylenediamine, heptamethylenediamine, octamethylenediamine, nonamethylenediamine and decamethylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyhexamethylenediamine, 5-methylnonamethylenediamine, 2,11-diaminododecane, 1,12-diaminooctadecane, 1,2-bis-(3-aminopropyl)-ethane, N,N'-dimethylethylenediamine, N,N'-diethyl-1,3-diaminopropane and N,N'-dimethyl-1,6-diaminohexane as well as the diamines of the formulae $H_2N(CH_2)_3O(CH_2)_2O(CH_2)_3NH_2$ and $H_2N(CH_2)_3S(CH_2)_3NH_2$.

Finally, 1,4-diaminocyclohexane and 4,4'-diaminodicyclohexylmethane may be mentioned as suitable cycloaliphatic diamines and 1,4-bis-(2-methyl-4-aminopentyl)-benzene, 1,4-bis-(1,1-dimethyl-5-aminopentyl)-benzene and 1,3- or 1,4-bis-(aminomethyl)-benzene may be mentioned as suitable araliphatic diamines.

The condensation reactions described can be carried out in a manner which is in itself known, preferably in an anhydrous organic solvent, for example N,N-dialkylamides of monocarboxylic acids with 1-4 carbon atoms, such as N,N-dimethylacetamide and N,N-dimethylformamide; N-methyl-2-pyrrolidone, N,N,N',N'-tetramethylurea, tetrahydrofurane, cyclohexanone, hexamethylphosphoric acid triamide (Hexametapol), tetrahydrothiophene dioxide (sulpholane) or dimethylsulphoxide. Depending on the nature of the reactants, the reaction temperatures are between about −20°C and +250°C.

The aminosilanes of the formula III, according to the definition, are also known in themselves or can be manufactured according to known methods.

The following may be mentioned as examples of suitable aminosilanes of the formula III; aminomethyl-di-n-propoxymethylsilane, (β-aminoethyl)-di-n-propoxy-methylsilane, (β-aminoethyl)-diethoxyphenylsilane, (β-aminoethyl)-tri-n-propoxysilane, (β-aminoethyl)-dimethoxy-methylsilane, (γ-aminopropyl)-di-n-propoxy-methylsilane, (γ-aminopropyl)-di-n-butoxy-methyl-silane, (γ-aminopropyl)-trimethoxysilane, (γ-aminopropyl)-triethoxysilane, (γ-aminopropyl)-di-n-pentoxy-phenylsilane, (γ-aminopropyl)-methoxy-n-propoxy-methylsilane, (δ-aminobutyl)-dimethoxy-methylsilane, (3-aminophenyl)-di-n-propoxy-methylsilane, (4-aminophenyl)-tri-n-propoxysilane, [β-(4-aminophenyl)-ethyl]-diethoxy-methylsilane, [β-(3-aminophenyl)-ethyl]-di-n-propoxy-phenylsilane, [γ-(4-aminophenyl)-propyl]-di-n-propoxymethylsilane, [γ-(4-aminophenoxy)-propyl]-di-n-propoxymethylsilane and [γ-(3-aminophenoxy)-propyl]-di-n-butoxymethylsilane. (γ-Aminopropyl)-triethoxysilane and [γ-(4-aminophenyl)-propyl]-di-n-propoxy-methylsilane, but very particularly (γ-aminopropyl)-di-n-propoxy-methylsilane and [γ-(amino-phenoxy)-propyl]-di-n-propoxy-methylsilane, are preferred.

The compounds of the formula IV are new; they can be manufactured in what is in itself a conventional manner by reaction of aminosilanes of the formula III with a tricarboxylic acid anhydride-chloride or tetracarboxylic acid dianhydride of the formula

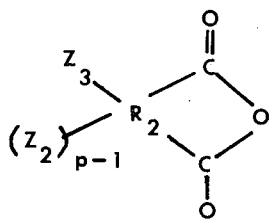

wherein $R_2$ has the meaning indicated under the formula I, p is the number 1 or 2, $Z_3$ together with $Z_2$, if p = 2, forms an anhydride group

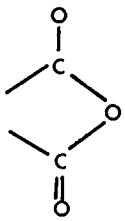

or $Z_3$, if p = 1, represents the —COCl radical, with $Z_2$ and $Z_3$ being in the ortho-position to one another and the anhydride group being bonded to adjacent carbon atoms of the radical $R_2$, such as pyromellitic acid dianhydride and benzophenonetetracarboxylic acid dianhydride, but above all trimellitic acid 1,2-anhydride-chloride. The reaction is preferably carried out in an anhydrous organic solvent, such as chlorinated aliphatic hydrocarbons, for example dichloroethane, methylene chloride or perchloroethylene, and in the presence of an acidbinding agent, such as triethylamine, at temperatures of about −40°C to +30°C. After completion of the reaction, and after filtering off the hydrochloride which has precipitated, the compounds of the formula IV can be purified by recrystallization from a suitable solvent, such as benzene.

Examples of suitable compounds of the formula IV are: trimellitic acid 1,2-anhydride-β-(trimethoxysilyl)-ethylamide, trimellitic acid 1,2-anhydride-γ-(di-n-propoxy-methylsilyl)-propylamide, trimellitic acid 1,2-anhydride-γ-(tri-n-propoxysilyl)-propylamide, trimellitic acid 1,2-anhydride-4'-[γ-(di-n-propoxy-methylsilyl)-propoxy]-anilide, trimellitic acid 1,2-anhydride-4'-[γ-(di-n-propoxy-methylsilyl)-propyl]-anilide, trimellitic acid 1,2-anhydride-3'-(diethoxy-methylsilyl)-anilide, pyromellitic acid 1,2-anhydride-4-[β-(trimethoxysilyl)-ethylamide], pyromellitic acid 1,2-anhydride-4-[γ-(di-n-propoxymethylsilyl)-propylamide] and benzophenonetetracarboxylic acid 3,4-anhydride-4'-[γ-(triethoxysilyl)-propylamide].

The reaction of the abovementioned starting products with at least 2 mols of an aminosilane of the formula III or of a compound of the formula IV, can be carried out in a manner which is in itself known, preferably in an anhydrous organic solvent at temperatures between about −20°C and +50°C, especially about −15°C to +25°C. Suitable organic solvents are: N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-ε-caprolactam, hexamethylphosphoric acid triamide (Hexametapol), N,N,N',N'-tetramethylurea, tetrahydrofurane, cyclohexanone, tetrahydrothiophene dioxide (sulpholane) and dimethylsulphoxide.

The reaction can also be carried out in mixtures of such solvents. On the other hand it is also possible to dilute these preferred solvent systems with other organic aprotic solvents, such as aromatic, cycloaliphatic or aliphatic, optionally chlorinated, hydrocarbons, for example benzene, toluene, xylenes, cyclohexane, pentane, hexane, petroleum ether and methylene chloride or dioxane.

If the aminosilanes of the formula III and/or the compounds of the formula IV are reacted with polymers according to the definition, the latter are suitably employed in the form of their solutions as obtained when the polymers are manufactured.

In the reaction with aminosilanes of the formula III or compounds of the formula IV, preferably at least 2 mols of the same aminosilane of the formula III or the same compound of the formula IV are used. However, to manufacture asymmetrical prepolymers of the formula I it is also possible to employ mixtures of the said compounds in corresponding molar amounts or to carry out the reaction stepwise with in each case at least one mol of a different aminosilane of the formula III or of a different compound of the formula IV.

In all these cases, the aminosilane or the compound of the formula IV is preferably employed in the stoichiometric amount.

A possible cyclisation of the prepolymers which can be used according to the invention, of the polyamide-acid or polyamide-amide-acid category, to the corresponding polyimides or polyamide-imides, by a chemical method prior to the thermal crosslinking, is also carried out in a manner which is in itself known, for example by gentle treatment with a dehydrating agent, used by itself or mixed with a tertiary amine; examples of agents which can be used are acetic anhydride, propionic anhydride and dicyclohexylcarbodiimide or a mixture of acetic anhydride and triethylamine or pyridine. To avoid premature crosslinking, the reaction should be carried out at temperatures which are as low as possible, preferably at a temperature below 50°C and in particular between about −20°C and +25°C. In general, however, such a chemical cyclisation preceding the crosslinking will be dispensed with.

The crosslinked polymers containing siloxane groups, according to the invention, are insoluble in organic solvents; they are distinguished by good mechanical, electrical and thermal properties, especially by good heat stability and good mechanical properties at low temperatures.

The crosslinking of the prepolymers is usually carried out during the conversion of the latter to industrial products, such as fibres, thin and thick films, coatings, foams, laminating resins, laminates, compression moulding powders, compression mouldings and the like. At the same time, customary additives, such as pigments, fillers and the like, can also be added to the prepolymers. Non-cyclised prepolymers which can be used according to the invention, with a or $a_1 < 10$, above all a or $a_1 < 5$, are, because of their good processability at temperatures around 160°C, above all suitable for the manufacture of laminates, foams and compression mouldings. The present invention therefore also relates to the use of polymers containing siloxane groups, which have been crosslinked in accordance with the invention, as industrial products, especially as laminates, foams or compression mouldings, if a or $a_1 < 10$.

EXAMPLE 1

13.553 g (0.0666 mol) of isophthalic acid dichloride are dissolved in 100 ml of anhydrous N,N-dimethylacetamide (DMA) at −15°C under nitrogen in a 750 ml sulphonation flask which is equipped with a stirrer, internal thermometer, dropping funnel and gas inlet tube. 3.6047 g (0.0333 mol) of m-phenylenediamine in solid form are introduced into this solution at −10° to −15°C, whilst cooling. After the exothermic reaction has subsided, the mixture is stirred for a further 2 hours at 0°–5°C and a solution of 6.746 g (0.0666 mol) of triethylamine in 50 of anhydrous DMA is then added dropwise at the same temperature. After stirring for 1 hour at 0°–5°C, a solution of 14.6266 g (0.0666 mol) of (γ-aminopropyl)-di-n-propoxymethylsilane and 6.746 g (0.0666 mol) of triethylamine in 50 ml of anhydrous DMA is added dropwise to the suspension obtained. The reaction mixture is then stirred for 2 hours at room temperature (20°–25°C) and the triethylamine hydrochloride which has precipitated is filtered off through a glass frit and rinsed 3 times with a total of 80 ml of anhydrous DMA. A slightly viscous solution of a polyamide prepolymer with terminal methyl-di-n-propoxysilyl groups and an average molecular weight ($\overline{M}$) of approx. 800 is obtained; $\eta_{inh}$. 0.07 dl/g (0.5 percent in DMA at 25°C).

The solution of the above prepolymer is poured onto an aluminium foil and heated as follows: For 3 hours to 70°C/ 30 mm Hg, for 3 hours to 110°C/30 mm Hg, for 10 hours to 150°C/ 30 mm Hg and finally for 4 hours to 200°C/0.1 mm Hg. A clear, mechanically firm coating of the corresponding crosslinked polyamide containing siloxane groups, having a silicon content of 9.3 percent by weight, is obtained. If the aluminium foil is dissolved off with dilute hydrochloric acid, a clear, colourless film of good mechanical strength is obtained.

EXAMPLE 2

Following the procedure described in Example 1, 4.866 g (0.045 mol) of m-phenylenediamine in anhydrous DMA, with the addition of 8.096 g (0.08 mol) of triethylamine, are reacted with 8.121 g (0.04 mol) of isophthalic acid dichloride. A solution of a polyamide block with terminal amino groups and an average molecular weight of approx. 2,000 is obtained. This solution is added dropwise over the course of 15 minutes, at 20°–25°C, to a solution of 4.856 g (0.01 mol) of trimellitic acid 1,2-anhydride-4'-[γ-di-n-propoxy-methylsilyl)-propoxy]-anilide of the formula

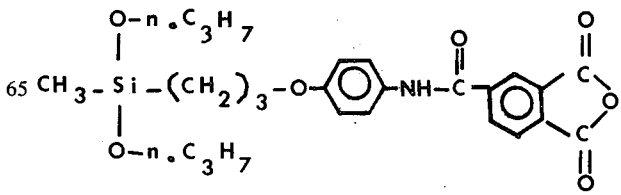

A solution of a polyamide prepolymer with terminal methyl di-n-propoxysilyl groups and an average molecular weight of approx. 3,000 results; $\eta_{inh}$. 0.19 dl/g (0.5 percent in DMA at 25°C).

After suitable dilution, this solution is converted, in the manner described in Example 1, to coatings or films of the corresponding crosslinked polyamide; silicon content 1.9 percent by weight.

The trimellitic acid 1,2-anhydride-4'-[γ-(di-n-propoxymethylsilyl)-propoxy]-anilide used in the above example can be prepared as follows:

50 ml of dichloroethane are initially introduced into a 1.5 l sulphonation flask which is equipped with a stirrer, internal thermometer, reflux condenser, 2 dropping funnels with pressure equilibration, and a nitrogen inlet, and are cooled to −30° to −40°C. 21.0 g (0.1 mol) of trimellitic acid 1,2-anhydride-chloride in 250 ml of dichloroethane and 31.1 g (0.1 mol) of [γ-(4-aminophenoxy)-propyl]-di-n-propoxy-methylsilane and 10.1 g of triethylamine in 250 ml of dichloroethane are then simultaneously added dropwise at −30°C over the course of 1 hour and 20 minutes. The reaction mixture is stirred for approx. 4 hours at −30°C, after which it is allowed to warm to room temperature. The triethylamine hydrochloride which has precipitated is filtered off under nitrogen and the filtrate is evaporated to dryness in vacuo, with exclusion of moisture. The resulting yellow crystalline powder is recrystallised 3–4 times from benzene, with exclusion of moisture, to remove residual triethylamine hydrochloride. Yield 38 g (76 percent of theory).

EXAMPLE 3

Analogously to the procedure described in Example 1, 10.814 g (0.1 mol) of m-phenylenediamine are dissolved in 100 ml of anhydrous DMA. 16.264 g (0.08 mol) of isophthalic acid dichloride in solid form are introduced into the resulting solution at −20°C, whilst cooling. The reaction mixture is then stirred for 2 hours at 0°–5°C and a solution of 16.192 g (0.16 mol) of triethylamine in 50 ml of dry DMA is then added dropwise. After stirring for one hour at 5°–10°C, the solution is cooled to −30°C and a solution of 8.4232 g (0.04 mol) of trimellitic acid 1,2-anhydride-chloride in 60 ml of 1,2-dichloroethane is added dropwise at this temperature. The reaction mixture is then kept at −20°C for 20 minutes, followed by 60 minutes at 5°–10°C, and finally a solution of 4.048 g (0.04 mol) of triethylamine in 50 ml of anhydrous DMA is added dropwise. After stirring the reaction mixture for a further hour, at 15°–20°C, the triethylamine hydrochloride is filtered off through a glass frit and carefully rinsed three times with DMA. A solution of 8.776 g (0.04 mol) of (γ-aminopropyl)-di-n-propoxy-methylsilane in 50 ml of DMA is introduced over the course of 10 minutes into the solution of the polyamide block with terminal anhydride groups (average molecular weight approx. 1,400) obtained above, at 15°–20°C. After stirring for 2 hours at room temperature (20°–25°C), a solution of a polyamide prepolymer with terminal methyl-di-n-propoxysilyl groups and an average molecular weight of approx. 1,850 is obtained; $\eta_{inh}$. 0.11 dl/g (0.5% in DMA at 25°C). This solution is made up to a total of 440 g with anhydrous DMA and 22 g (0.001 mol) of the resulting diluted solution are converted, in the manner described in Example 1, to coatings or films of the corresponding crosslinked polyamide, having good thermal and mechanical properties; silicon content: 3.2 percent by weight.

EXAMPLE 4

Analogously to Example 3, 21.628 g (0.2 mol) of m-phenylenediamine, 32.528 g (0.16 mol) of isophthalic acid dichloride and 32.4 g (0.32 mol) of triethylamine are first reacted with 16.830 g (0.08 mol) of trimellitic acid 1,2-anhydride-chloride to give a polyamide block with anhydride end groups and subsequently with 24.920 g (0.08 mol) of [γ-(4-aminophenoxy)-propyl]-di-n-propoxy-methylsilane to give a polyamide prepolymer with terminal methyl-di-n-propoxysilyl groups; average molecular weight approx. 2,000. The resulting solution is made up to a total of 727 g with anhydrous DMA, and 36.34 g (0.002 mol) of the resulting diluted solution are converted, in the manner described, to coatings or films of the corresponding crosslinked polyamide; silicon content: 2.9 percent by weight.

EXAMPLE 5

26.5 g (0.082 mol) of finely powdered 3,3',4,4'-benzophenonetetracarboxylic acid dianhydride are suspended in 50 ml of anhydrous DMA under a nitrogen atmosphere in a 350 ml sulphonation flask which is equipped with a stirrer, dropping funnel and internal thermometer. A solution of 8.15 g (0.041 mol) of 4,4'-diaminodiphenylmethane in 34 ml of anhydrous DMA is added dropwise to the resulting suspension over the course of 30 minutes whilst stirring at 10°–15°C, and the reaction mixture is then stirred for 2 hours at room temperature (20°–25°C). The resulting solution is cooled to 0°–5°C; thereafter, 25.6 g (0.082 mol) of [γ-(4-aminophenoxy)-propyl]-di-n-propoxy-methylsilane are added dropwise at this temperature over the course of 30 minutes. The solution is then stirred for one hour at room temperature. In this way, a 43 percent strength solution of a polyamide-acid prepolymer is obtained, which has a viscosity of 300 centipoises at room temperature. $\eta_{inh}$. of the prepolymer 0.083 dl/g (0.5 percent in DMA at 25°C).

Glassfibre fabric (for example E-glass with an aminosilane finish) is impregnated with this solution by drawing the fabric once through the polymer solution. The impregnated fabric is dried for one hour at 50°C/200 mmmHg and for one hour at 50°C/10⁻¹ mm Hg. Several of the prepregs thus obtained are stacked above one another and pressed in a platen press at 165°C, for 5 minutes under contact pressure and for 7 hours under a pressure of 500 kp/cm², to give laminates. The pressure is periodically released during the first hour in order to facilitate the removal of volatile products. The laminates are then post-cured for 16 hours at 160°–200°C/20 mm Hg. After complete curing, the resin content of the laminates is 20 percent by weight (determined by ashing). Well-bonded, bubble-free laminates of good heat stability and excellent mechanical and electrical properties are obtained.

EXAMPLE 6

Analogously to the procedure described in Example 5, 64.45 g (0.2 mol) of finely powdered 3,3',4,4'-benzophenonetetracarboxylic acid dianhydride are reacted with 20.03 g (0.1 mol) of 4,4'-diaminodiphenyl-ether and 62.30 g (0.2 mol) of [γ-(4-aminophenoxy)-propyl]-di-n-propoxy-methylsilane in 240 ml of anhydrous DMA. A 40 percent strength solution of a polyamide-acid prepolymer which has a viscosity of 400 centipoise at 23°C is obtained.

Prepregs are prepared with this solution in the manner described in Example 5 and are subsequently pressed to give laminates having good mechanical and electrical properties.

EXAMPLE 7

Following the procedure described in Example 5, 26.5 g (0.082 mol) of 3,3',4,4'-benzophenonetetracarboxylic acid dianhydride in 84 ml of anhydrous DMA are reacted with 8.15 g (0.041 mol) of 4,4'-diaminodiphenylmethane. The resulting solution of the polyamide-acid block possessing anhydride end groups is then treated with 18.0 g (0.082 mol) of ($\gamma$-aminopropyl)-di-n-propoxy-methylsilane at 0°–5°C and the mixture is stirred for one hour at room temperature. A 40 percent strength solution of a polyamide-acid prepolymer which has a viscosity of 300 centipoise at 25°C is obtained and is converted, in the manner described in Example 5, to laminates of the corresponding crosslinked polyimide. $\eta_{inh}$ of the prepolymer 0.086 dl/g (0.5 percent in DMA at 25°C). The laminates show good mechanical properties even at low temperatures.

EXAMPLE 8

26.5 g (0.082 mol) of 3,3',4,4'-benzophenonetetracarboxylic acid dianhydride in 130 ml of anhydrous tetrahydrofurane are heated under reflux in a nitrogen atmosphere in a 750 ml sulphonation flask equipped with a stirrer, dropping funnel and internal thermometer.

A solution of 8.15 g (0.041 mol) of 4,4'-diaminodiphenylmethane in 72 ml of anhydrous tetrahydrofurane is added dropwise to the resulting suspension over the course of 30 minutes whilst stirring under reflux and the reaction mixture is then kept under reflux for a further hour. The resulting solution is cooled to 0°–5°C. At this temperature, 25.6 g (0.082 mol) of [$\gamma$-(4-aminophenoxy)-propyl]-di-n-propoxy-methylsilane are added dropwise over the course of 15 minutes and the mixture is stirred for a further hour at 0°–5°C. A 25 percent strength solution of a polyamide-acid prepolymer having an average molecular weight of approx. 1,500 is obtained.

Glassfibre fabric is impregnated with this prepolymer solution in the manner described in Example 5, but the fabric is merely dried for one hour at 50°C/200 mm Hg. The production of laminates by pressing the prepregs thus obtained is carried out in the manner indicated in Example 5. Firmly bonded, bubble-free laminates of the corresponding crosslinked polyimide, having a resin content of 19 percent by weight, are obtained. The laminates show good mechanical and thermal properties.

EXAMPLE 9

26.5 g (0.082 mol) of 3,3',4,4'-benzophenonetetracarboxylic acid dianhydride in 40 g of anhydrous cyclohexanone are heated under reflux in a nitrogen atmosphere in a 350 ml sulphonation flask of the type described. A solution of 815 g (0.041 mol) of 4,4'-diaminodiphenylmethane in 39 g of anhydrous cyclohexanone is added dropwise to the resulting suspension over the course of 30 minutes whilst stirring under reflux. The resulting solution is stirred for a further hour at reflux and is then cooled to −5°C. At this temperature, 2.56 g (0.082 mol) of [$\gamma$-(4-aminophenoxy)-propyl]-di-n-propoxy-methylsilane are added dropwise over the course of 15 minutes and the reaction mixture is stirred for a further half hour. A 40 percent strength solution of a polyamide-acid prepolymer having methyl-di-n-propoxysilyl end groups and possessing an average molecular weight of approx. 1,500 is obtained.

This solution is coverted, in the manner described in the preceding Example 5, to a glassfibre laminate of the corresponding crosslinked polyimide. Firmly bonded, bubble-free laminates of good flexural strength and heat stability are obtained.

EXAMPLE 10

4.06 g (0.02 mol) of isophthalic acid dichloride are dissolved in 25 ml of anhydrous DMA under nitrogen at −15°C. 1.08 g (0.01 mol) of pulverulent m-phenylenediamine are added in portions whilst stirring and the reaction mixture is stirred for 1 hour at 0°C. A solution of 2.02 g (0.02 mol) of triethylamine in 7 ml of anhydrous DMA is then added dropwise at this temperature and the mixture is stirred for a further hour. Finally, a solution of 4.4 g (0.02 mol) of ($\gamma$-aminopropyl)-di-n-propoxy-methylsilane and 2.02 g (0.02 mol) of triethylamine in 7 ml of anhydrous DMA is added dropwise and the reaction mixture is stirred for 2 hours at room temperature. The triethylamine hydrochloride which has precipitated is filtered off. A clear solution of the prepolymer is obtained.

This solution is completely evaporated to dryness in vacuo at 60°C. The resulting dry compression moulding powder is compression moulded to give sheets by the compression moulding process at 165°C under a pressure of 200 kp/cm². For postcuring, the sheets are heated to 200°C/10⁻¹ mm Hg for 16 hours. Transparent sheets having a silicon content of 9.1 percent by weight are obtained.

EXAMPLE 11

8.12 g (0.04 mol) of isophthalic acid dichloride are dissolved in 60 ml of anhydrous DMA at −15°C under nitrogen in a 200 ml sulphonation flask equipped with a stirrer, dropping funnel and internal thermometer. A solution of 17.5 g (0.08 mol) of ($\gamma$-aminopropyl)-di-n-propoxy-methylsilane and 8.08 g (0.08 mol) of triethylamine in 40 ml of anhydrous DMA is added dropwise thereto at a temperature of −10°C to −15°C, whilst stirring. The reaction mixture is then stirred for 2 hours at 0°C to 5°C and then for a further 2 hours at room temperature (20°–25°C). After filtering off the triethylamine hydrochloride, which has precipitated, on a glass frit, a solution of the prepolymer (a = o) is obtained. $\eta_{inh}$ of the prepolymer 0.04 dl/g (0.5 percent in DMA at 25°C).

Glassfibre fabric is impregnated by dipping it in the resulting prepolymer solution. The impregnated fabric is then briefly dried in a vacuum drying cabinet at 50°C/300 mm Hg. This operation is repeated 7 more times in order to apply sufficient resin to the fabric. The fabric is then dried for one hour at 50°C/300 mm Hg and for 1 hour at 50°C/10⁻² mm Hg. Several of the dried prepregs thus obtained are stacked above one another, pressed in a platen press at 165°C under a pressure of 400 kp/cm² for 7 hours and then post-cured for 16 hours at 200°C/10⁻¹ mm Hg. A laminate of good bond strength is obtained.

EXAMPLE 12

12.9 g (0.04 mol) of finely powdered 3,3',4,4'-benzophenonetetracarboxylic acid dianhydride are suspended in 50 ml of anhydrous DMA under nitrogen in a 200 ml sulphonation flask which is equipped with a stirrer, dropping funnel and internal thermometer. The reaction mixture is cooled to 0°–5°C and 17.5 g (0.08 mol) of (γ-aminopropyl)-di-n-propoxy-methylsilane are then added dropwise, whilst stirring. After stirring the reaction mixture for one hour at room temperature, a clear solution of the prepolymer (a = 0) is produced; $\eta_{inh}$. of the prepolymer 0.044 dl/g (0.5 percent in DMA at 25°C).

Glassfibre fabric is impregnated with this solution in the manner described in Example 10, and converted to prepregs and finally to laminates.

EXAMPLES 13 – 16

A solution of 10.01 g (0.05 mol) of 4,4'-diaminodiphenylether (II) in 60 ml of anhydrous DMA is added dropwise over the course of 15 minutes to a solution of 13.08 g (0.06 mol) of pyromellitic acid dianhydride (PMDA; I), in 40 ml of anhydrous DMA under nitrogen at between 20° and 30°C in an apparatus of the type described in Example 5, and after completion of the addition the mixture is further stirred at room temperature for about 1 hour. A solution of 6.4 g (0.022 mol) of (γ-aminopropyl)-di-n-propoxy-methylsilane (III) in 10 ml of DMA is then added dropwise at room temperature and the reaction mixture is stirred for a further hour. A clear, yellowcoloured, approx. 25 percent strength solution of a polyamide-acid prepolymer of the above formula having two silicon-functional end groups and an average value of a = 5 is thus obtained, the solution having a viscosity of approx. 60 centipoise at 20°C; $\eta_{inh}$. of the prepolymer 0.21 dl/g (0.5% in DMA at 25°C).

The prepolymer solutions listed in the table below are prepared analogously using reactants I, II and III.

Films with similar properties can be obtained if, in the above examples, the pyromellitic acid dianhydride is replaced, for example by corresponding amounts of benzophenonetetracarboxylic acid dianhydride, and the 4,4'-diaminodiphenyl-ether is replaced by corresponding amounts of 4,4'-diaminodiphenylmethane.

EXAMPLE 17

32.22 g (0.1 mol) of finely powdered 3,3',4,4'-benzophenonetetracarboxylic acid dianhydride are dissolved in 120 ml of anhydrous DMA under nitrogen in an apparatus of the type described in Example 1. A solution of 9.91 g (0.05 mol) of 4,4'-diaminodiphenylmethane in 80 ml of DMA is added dropwise at 10°–15°C in such a way that the temperature of the reaction solution does not exceed 15°C. The reaction solution is then stirred for 2 hours at approx. 25°C. The solution is then cooled to 0°–5°C and at this temperature a solution of 31.15 g (0.1 mol) of [γ-(4-aminophenoxy)-propyl]-di-n-propoxy-methylsilane in 35 ml of anhydrous DMA is added dropwise. Finally, the reaction solution is stirred for a further hour at approx. 25°C.

A mixture of 90 ml of acetic anhydride and 60 ml of pyridine is added dropwise to this solution whilst stirring and the mixture is stirred for a further 16 hours. A voluminous precipitate forms. The reaction mixture is poured into a large excess of water whilst stirring vigorously and the product which has precipitated is filtered off, washed with water and dried for 24 hours at 50°C/100 mm Hg and for 24 hours at 50°C/10⁻¹ mm Hg. After grinding in a ball mill, the imidised (cyclised) prepolymer is obtained as a fine yellow powder.

This powder is introduced into a compression mould, heated to 300°C, for circular discs, and is heated under contact pressure for 3 minutes with repeated venting. The pressure is then raised stepwise to 325 kp/cm² and is maintained thereat for 1 hour at 300°C. After release from the mould at 220°C, transparent discs of good flexural strength and good electrical properties are Table

| Example No. | PMDA I g | mol | II g | mol | III g | mol | Viscosity of the solution, centipoise | a = (average) | $\eta_{inh}$. (0.5% in DMA) |
|---|---|---|---|---|---|---|---|---|---|
| 14 | 11.99 | 0.055 | 10.01 | 0.05 | 2.19 | 0.01 | approx. 200 | 10 | 0.38 dl/g |
| 15 | 11.45 | 0.052 | 10.01 | 0.05 | 1.45 | 0.005 | approx. 1,800 | 25 | 0.60 dl/g |
| 16 | 11.27 | 0.0516 | 10.01 | 0.05 | 0.98 | 0.0034 | approx. 2,500 | 30 | 0.73 dl/g |

Films were cast from the above prepolymer solutions both on glass plates and on aluminum sheets; after stripping off the solvent, these films were converted into crosslinked siloxane-containing polyimide films by heating to 220°C for 2 hours and subsequently heating to 250°C for one hour. The resulting crosslinked films are insoluble even in strongly polar organic solvents. Silicon contents of the films:

For a = 5 approx. 2.0 percent by weight
For a = 10 approx. 1.2 percent by weight
For a = 25 approx. 0.7 percent by weight
For a = 30 approx. 0.5 percent by weight.

These siloxane-modified polyimide films display exceptionally high adhesion to glass and metal surfaces and cannot be detached mechanically from the latter. By dissolving off the aluminum base with HCl, unsupported films can be obtained which in addition to very good heat stability and excellent electrical properties, exhibit good mechanical strengths and high elasticity.

obtained.

EXAMPLE 18

Analogously to the procedure described in Example 5, 25.78 g (0.08 mol) of finely powdered 3,3',4,4'-benzophenonetetracarboxylic acid dianhydride are reacted with 4.33 g (0.04 mol) of p-phenylenediamine and 17.55 g (0.08 mol) of (γ-aminopropyl)-di-n-propoxy-methylsilane in 120 ml of anhydrous DMA. A 30 percent strength solution of a polyamide-acid prepolymer having a viscosity of approx. 200 centipoise at 25°C is obtained: $\eta_{inh}$. of the prepolymer 0.081 dl/g (0.5 percent in DMA at 25°C). Using this solution, laminates are prepared in the manner described in Example 5.

EXAMPLE 19

Analogously to the procedure described in Example 5, 25.78 (0.08 mol) of 3,3',4,4'-benzophenonetetracarboxylic acid dianhydride, 7.94 g (0.04 mol) of 4,4'-diaminodiphenylmethane and 17.70 g (0.08 mol) of (γ-aminopropyl)-triethoxysilane are reacted in 82 ml of anhydrous DMA. A 40 percent strength solution of a polyamide-acid prepolymer is obtained; $\eta_{inh.}$ of the prepolymer 0.08 dl/g (0.5 percent in DMA at 25°C). Using this solution, prepregs are prepared in the manner described in Example 5 and are pressed to give laminates.

EXAMPLE 20

Analogously to the procedure described in Example 5, 17.45 g (0.08 mol) of pyromellitic acid dianhydride, 7.94 g (0.04 mol) of 4,4'-diaminodiphenyl-ether and 17.54 g (0.08 mol) of (γ-aminopropyl)-di-n-propoxy-methylsilane are reacted in 79 ml of anhydrous DMA. A 31 percent strength solution of a polyamide acid prepolymer is obtained. $\eta_{inh.}$ of the prepolymer 0.09 dl/g (0.5 percent in DMA at 25°C).

Using this prepolymer solution, prepregs are prepared in the manner described in Example 5 and are subsequently pressed to give a laminate with good mechanical and electrical properties.

EXAMPLE 21

5.26 g (0.025 mol) of trimellitic acid 1,2-anhydride-chloride are dissolved in 35 ml of anhydrous DMA at −15°C to −20°C under nitrogen in an apparatus of the type described in Example 5. A solution of 2.48 g (0.0125 mol) of 4,4'-diaminodiphenylmethane and 2.53 g (0.025 mol) of triethylamine in 15 ml of anhydrous DMA is added dropwise to the solution obtained, whilst cooling and stirring constantly, in such a way that the temperature in the reaction vessel does not exceed −15°C. After completion of the addition, the mixture is stirred for a further 15 minutes at the same temperature and a solution of 5.38 g (0.025 mol) of (γ-aminopropyl)-di-n-propoxymethylsilane in 6 ml of anhydrous DMA is then added dropwise. Thereafter, the reaction mixture is stirred for 2 hours at 20°–25°C and the triethylamine hydrochloride which has precipitated is removed by filtration.

A mixture of 45 ml of acetic anhydride and 30 ml of pyridine is then added dropwise to the filtered solution, whilst stirring, and the whole is stirred for a further 16 hours at room temperature. A fine precipitate forms. The reaction mixture is poured into a large excess of water whilst stirring vigorously and the product which has precipitated is filtered off, repeatedly rinsed with water and dried for 20 hours at 50°/100 mm Hg and for 20 hours at 50°C/10$^{-1}$ mm Hg. After pulverising in a mortar, the imidised prepolymer is obtained as a fine yellowish powder.

This powder is introduced into a compression mould for circular discs which is heated to 300°C and the powder is heated for 3 minutes under contact pressure, with repeated venting. The pressure is then raised stepwise to 900 kg/cm$^2$ and this pressure is maintained at 300°C for 1 hour. After release from the mould at 220°C, transparent discs of good flexibility are obtained; silicon content: 7.5 percent by weight.

The solution of the prepolymer, obtained in accordance with paragraph 1 of the above example, can be used for the production of laminates as described in the preceding examples. Laminates of good flexural strength are obtained by impregnating glass fibres 5 times, brief drying at 50°C/100 mm Hg and subsequent pressing of the prepregs at 150°C/5 minutes contact pressure, 30 minutes at 125 kg/cm$^2$, 30 minutes at 250 kp/cm$^2$ and 6 hours at 375 kg/cm$^2$, and post-curing at 225°C/10$^{-2}$ mm Hg for 16 hours.

EXAMPLE 22

12.63 g (0.06 mol) of trimellitic acid 1,2-anhydride-chloride are dissolved in 60 ml of anhydrous DMA at −15°C under nitrogen in an apparatus of the type described in Example 5. A solution of 26.32 g (0.12 mol) of (γ-aminopropyl)-di-n-propoxy-methylsilane and 6.07 g (0.06 mol) of triethylamine in 37 ml of anhydrous DMA is added dropwise to this solution, whilst stirring, in such a way that the reaction temperature does not exceed −15°C. After completion of the addition, the reaction mixture is stirred for 1 hour at 0°C and then for 1 hour at room temperature (20°–25°C), after which the triethylamine hydrochloride which has precipitated is filtered off. A clear 30 percent strength solution of a prepolymer is obtained.

Glass fibre fabric is impregnated with this prepolymer solution and briefly dried in a vacuum drying cabinet at 50°C/300 mm Hg. This operation is repeated 7 more times in order to apply sufficient resin to the fabric. The fabric is then dried for one hour at 50°C/100 mm Hg and for 1 hour at 50°C/10$^{-2}$ mm Hg. Several of the dried prepregs thus obtained are stacked on top of one another and pressed in a platen press at 130°C – 150°C to give laminates.

EXAMPLE 23

5.28 g (0.0275 mol) of trimellitic acid anhydride and 10.91 g (0.055 mol) of 4,4'-diaminodiphenylmethane in 70 ml of N-methylpyrrolidone are heated for 4 hours to 185°C under nitrogen, whilst stirring. After cooling, the resulting solution is added dropwise to 17.73 g (0.055 mol) of 3,3',4,4'-benzophenonetetracarboxylic acid dianhydride in 50 ml of N-methylpyrrolidone at 0°C under nitrogen, whilst stirring. The reaction mixture is then stirred for 1 hour at room temperature and cooled to 0°–5°C, and a solution of 12.07 g (0.055 mol) of (γ-aminopropyl)-di-n-propoxy-methylsilane in 10 ml of N-methylpyrrolidone is added dropwise. The reaction mixture is then stirred for a further hour at room temperature. A 30 percent strength solution of a polyamide-imidepolyamide-acid prepolymer is obtained, which is converted to well-bonded laminates by impregnating twice, pressing the prepregs at 165°C and post-curing at 225°C. The prepolymer solution obtained can also be used, in accordance with the method described in Example 17, paragraphs 2 and 3, for the manufacture of mouldings by first preparing a compression moulding powder of the fully imidised prepolymer by using 90 ml of acetic anhydride and 60 ml of pyridine and subsequently compression moulding this powder at 315°C for 15 minutes, in the manner indicated in Example 17, to give discs; silicon content: 4.1 percent by weight.

EXAMPLE 24

8.06 g (0.025 mol) of 3,3',4,4'-benzophenonetetracarboxylic acid dianhydride and 5.26 g (0.025 mol) of trimellitic acid 1,2-anhydride-chloride are introduced into 45 ml of anhydrous DMA at −15°C under nitrogen in an apparatus of the type described in Example 5. A solution of 4.96 g (0.025 mol) of 4,4'-diaminodiphenylmethane and 2.53 g (0.025 mol) of triethylamine in 15 ml of anhydrous DMA is added dropwise thereto, whilst stirring, in such a way that the reaction temperature does not exceed −15°C. After completion of the addition and after stirring the reaction mixture for 2 hours at this temperature, a solution of 10.76 g (0.05 mol) of (γ-aminopropyl)-di-n-propoxy-methylsilane in 12 ml of anhydrous DMA is added dropwise. The reaction mixture is then stirred for 2 hours at 20°–25°C and the triethylamine hydrochloride which has precipitated is filtered off. A 30 percent strength solution of a polyamide-amide-acid prepolymer is obtained which can be converted to laminates of good bond strength in the manner described in the preceding examples, at temperatures between 130° and 165°C.

EXAMPLE 25

Analogously to Example 24, 8.06 g (0.025 mol) of 3,3′,4,4′-benzophenonetetracarboxylic acid dianhydride, 5.26 g (0.025 mol) of trimellitic acid 1,2-anhydride-chloride, 4.96 g (0.025 mol) of 4,4′-diaminodiphenylmethane, 2.53 g (0.025 mol) of triethylamine and 10.76 g (0.05 mol) of (γ-aminopropyl)-di-n-propoxy-methylsilane are reacted in 82 ml of anhydrous DMA. After filtering off the triethylamine hydrochloride, a mixture of 90 ml of acetic anhydride and 60 ml of pyridine is added dropwise to the reaction solution, whilst stirring, and the whole is stirred for 16 hours at 20°–25°C. A precipitate forms. The reaction mixture is then poured into a large excess of water, with vigorous stirring, and the product which has precipitated is filtered off, repeatedly washed with water and dried for 20 hours at 50°C/100 mm Hg and for 20 hours at 50°C/$10^{-1}$ mm Hg. After pulverising, the imidised prepolymer is obtained as a fine yellowish powder.

This powder is compression moulded in the manner described in Example 21, paragraph 3, at 305°C, to give transparent discs of good flexibility; silicon content: 6.4 percent by weight.

EXAMPLE 26

Analogously to Example 24, 9.159 g (0.0435 mol) of trimellitic acid 1,2-anhydride-chloride, 9.48 g (0.0435 mol) of pyromellitic acid dianhydride, 8.71 g (0.0435 mol) of 4,4′-diaminodiphenyl-ether, 4.40 g (0.0435 mol) of triethylamine and 19.26 g (0.087 mol) of (γ-aminopropyl)-triethoxysilane are reacted in 130 ml of anhydrous DMA. A solution of a polyamide-amide-acid prepolymer is obtained, which is used, in the manner described, for laminating glass fibres.

EXAMPLE 27

4.34 g (0.0218) mol) of 4,4′-diaminodiphenylmethane and 1.66 g (0.0164 mol) of triethylamine are dissolved in 50 ml of anhydrous DMA under nitrogen in an apparatus of the type described in Example 5, and the solution is cooled to −15°C. 3.46 g (0.0164 mol) of trimellitic acid 1,2-anhydride-chloride in powder form are added in portions to this solution in such a way that the reaction temperature does not exceed −15°C. The reaction mixture is then stirred for 1 hour at −15°C and for a further hour at 20°–25°C. The resulting solution is added dropwise to a solution of 2.2 g (0.0068 mol) of 3,3′,4,4′-benzophenonetetracarboxylic acid dianhydride in 40 ml of anhydrous DMA at 0°C, whilst stirring. The reaction solution is stirred for a further hour at 20°–25°C and then cooled to 0°–5°C, and a solution of 0.6 g (0.0027 mol) of (γ-aminopropyl)-di-n-propoxy-methylsilane in 10 ml of DMA is added. The reaction solution is stirred for a further hour at 20°–25°C and the triethylamine hydrochloride which has precipitated is then filtered off. A solution of a prepolymer with a block-like arrangement of the polyamide-amide-acid units is obtained.

This solution is cast on aluminum sheets and spread to give a thin layer. The sheets have beforehand been roughened mechanically and cleaned with acetone. The coated sheets are dried in a drying cabinet under the following conditions: 16 hours at 50°C/20 mm Hg, 30 minutes each at 70°C/20 mm Hg, 90°C/20 mm Hg, 100°C/20 mm Hg, 120°C/20 mm Hg and 140°C/20 mm Hg and finally 2 hours at 150°C/20 mm Hg. The coatings are then post-cured for 2 hours at 230°C/$10^{-2}$ mm Hg. This gives bubble-free coatings which exhibit good adhesion; silicon content: 0.82 percent by weight.

Films can also be produced from the above solution under analogous drying conditions.

EXAMPLE 28

Analogously to the procedure described in Example 21, paragraph 1, 2.316 g (0.011 mol) of trimellitic acid 1,2-anhydride-chloride, 3.544 g (0.011 mol) of 3,3′,4,4′-benzophenonetetracarboxylic acid dianhydride, 3.965 g (0.020 mol) of 4,4′-diaminodiphenylmethane, 2.226 g (0.022 mol) of triethylamine and 0.877 g (0.004 mol) of (γ-aminopropyl)-di-n-propoxy-methylsilane are reacted in 102 ml of anhydrous DMA. After filtering off the triethylamine hydrochloride, a clear solution of a polyamide-amide-acid prepolymer with a statistical distribution of the polyamide-amide-acid and polyamide-acid units is obtained.

Films are cast with this solution both on glass plates and on aluminum sheets. After stripping off the solvent in vacuo by heating for three hours at 70°C, three hours at 110°C and 3 hours at 150°C and subsequently for 4 hours at 250°C, crosslinked polyamide-imide films containing siloxane groups are obtained; silicon content: 1.2 percent by weight.

EXAMPLE 29

Analogously to the procedure described in Example 21, paragraph 1, 6.74 g (0.032 mol) of trimellitic acid 1,2-anhydride-chloride, 5.95 g (0.030 mol) of 4,4′-diaminodiphenylmethane, 3.24 g (0.032 mol) of triethylamine and 0.88 g (0.004 mol) of (γ-aminopropyl)-di-n-propoxy-methylsilane are reacted in 141 ml of anhydrous DMA. After filtering off the triethylamine hydrochloride, a clear solution of a polyamide-amide-acid prepolymer is obtained, which is converted into films and coatings in the manner described in the preceding examples. Silicon content: 0.96 percent by weight.

EXAMPLE 30

A. Preparation of a polyamide block with amino end groups 2.812 g (0.026 mol) of m-phenylenediamine are dissolved in 50 ml of anhydrous DMA under nitrogen in a 500 ml sulphonation flask equipped with a stirrer, internal thermometer, dropping funnel and a nitrogen inlet tube. 4.872 g (0.024 mol) of isophthalic acid dichloride in solid form are added in portions to the resulting solution, whilst cooling to −15°C to −5°C, and the reaction mixture is kept for one hour at −5°C and then for 3 hours at 20°–25°C. A solution of 4.84 g (0.048 mol) of triethylamine in 30 ml of anhydrous DMA is then added dropwise at 5°–10°C to neutralise the hydrogen chloride produced. After stirring for one hour at room temperature, the triethylamine hydrochloride which has precipitated is filtered off under nitrogen and the reaction product is washed carefully three times with a little anhydrous DMA.

B. Preparation of a polyamide-acid block with anhydride end groups 9.02 g (0.028 mol) of 3,3',4,4'-benzophenonetetracarboxylic acid dianhydride are suspended in 65 ml of anhydrous DMA under nitrogen in an apparatus of the type described above. A solution of 4.806 g (0.024 mol) of 4,4'-diaminodiphenyl-ether in 50 ml of anhydrous DMA is then added dropwise at 5°–20°C. The reaction mixture is then stirred for 1 hour at 20°–25°C.

C. Preparation of a polyamide-polyamide-acid prepolymer

The solution obtained according to A) is added dropwise to the solution obtained according to B) under nitrogen at 5°–10°C. Thereafter, the reaction mixture is stirred for 1 hour at 20°–25°C and is then cooled to 0°–5°C, and a solution of 0.878 g (0.004 mol) of (γ-aminopropyl)-di-n-propoxy-methylsilane is added dropwise. The resulting reaction solution is stirred for a further hour at 20°–25°C. A solution of a polyamide-polyamide-acid block copolymer is obtained which is converted to films by casting and subsequent drying (1 hour at 80°C and 1 hour at 150°C, 2 hours at 220°C and 1 hour at 250°C); silicon content: 0.56 percent by weight.

EXAMPLE 31

A. Preparation of a polyamide block with amino end groups

Analogously to the procedure described in Example 30 under A), 14.059 g (0.130 mol) of m-phenylenediamine, 24.364 g (0.12 mol) of isophthalic acid dichloride and 24.288 g (0.24 mol) of triethylamine are reacted in 178 ml of anhydrous DMA to give a polyamide block with amino end groups.

B. Preparation of the prepolymer

The solution obtained according to A) is added dropwise to a solution of 4.834 g (0.015 mol) of 3,3',4,4'-benzophenonetetracarboxylic acid dianhydride in 163 ml of anhydrous DMA at 0°C under nitrogen, whilst stirring. Thereafter, the resulting reaction solution is stirred for 1 hour at 20°–25°C and then cooled to 0°–5°C, and a solution of 2.194 g (0.01 mol) of (γ-aminopropyl)-di-n-propoxy-methylsilane in 10 ml of anhydrous DMA is added. After stirring for a further hour at 20°–25°C, a prepolymer solution is obtained, with which films are produced in the manner described in Example 31; silicon content: 0.8 percent by weight.

It is also possible to prepare the imidised prepolymer as a fine powder from the above solution, using 120 ml of acetic anhydride and 80 ml of pyridine, analogously to the procedure described in Example 17.

This powder is moulded by the compression process at 300°–320°C to give sheets or bars of good flexural strength and good electrical properties.

EXAMPLE 32

A. Preparation of a polyamide block with amino end groups

Analogously to the procedure described in Example 30 under A), 14.059 g (0.13 mol) of m-phenylenediamine, 24.364 g (0.12 mol) of isophthalic acid dichloride and 24.288 g (0.24 mol) of triethylamine are reacted in 176 ml of anhydrous DMA to give a polyamide block with amino end groups.

B. Preparation of the prepolymer

To the solution obtained according to A) are added, whilst stirring and under nitrogen, at −15°C, first 0.404 g (0.004 mol) of triethylamine in 5 ml of DMA and then, in portions, a mixture of 1.289 g (0.004 mol) of pulverulent 3,3',4,4'-benzophenonetetracarboxylic acid dianhydride and 0.842 g (0.004 mol) of pulverulent trimellitic acid 1,2-anhydride-chloride. In the course thereof, the reaction temperature should not exceed −15°C. After completion of the addition, the reaction mixture is stirred first for 1 hour at −15°C and then for a further hour at 0°C and thereafter a solution of 1.878 g (0.004 mol) of trimellitic acid 1,2 -anhydride 4'-[γ-(di-n-propoxy-methylsilyl)-propyl]-anilide in 39 ml of anhydrous DMA is added dropwise. The reaction mixture is then stirred for a further 2 hours at 20°–25°C and is freed by filtration from the triethylamine hydrochloride which has precipitated. A solution of a polyamide-polyamide-acid prepolymer with a statistical distribution of the amide-acid units is obtained, which is used for the production of films and coatings in accordance with the methods described; silicon content: 0.33 percent by weight.

The imidised prepolymer can be prepared as a powder from the above solution using 60 ml of acetic anhydride and 40 ml of pyridine, analogously to the procedure described in Example 17. The powder can be processed by the compression process at 280°C to give sheets and bars of good flexural strength and good electrical properties.

EXAMPLE 33

Following the procedure described in Example 1, paragraph 1, 30.5 g (0.15 mol) of isophthalic acid dichloride, 10.81 g (0.1 mol) of m-phenylenediamine, 30.4 g (0.3 mol) of triethylamine and 21.94 g (0.1 mol) of (γ-aminopropyl)-di-n-propoxymethylsilane are reacted in 606 ml of anhydrous DMA. After filtering off the triethylamine hydrochloride formed, the reaction solution is poured into a large excess of water, with vigorous stirring. A fine white precipitate separates out, which is filtered off and dried for 16 hours at 50°C/10⁻¹ mm Hg. After grinding in a mortar, a polyamide prepolymer is obtained in the form of a fine white powder.

This powder is foamed by heating it in a closed mould to 200°C for 10 minutes. A white, hard foam of uniform pore size is obtained; silicon content: 6.64 percent by weight.

EXAMPLE 34

A 25 percent strength solution of the polyamide-acid prepolymer prepared according to Example 7 is completely evaporated to dryness in vacuo at 50°C. The resulting powder is pressed by the compression-moulding process at 175°C under a pressure of 500 kp/cm$^2$, to give standard bars. The compression mouldings are post-cured by heating them to 225°C/10⁻¹ mm Hg for 16 hours. Bars of good heat stability and excellent mechanical properties even at low temperatures are obtained.

What we claim is:

1. Crosslinked polyamides, polyimides or polyamide-imides containing siloxane groups, with a silicon content of 0.1 to 17.0% by weight, which are obtainable by heating silicon-modified polyamide, polyamide-acid or polyamide-amide-acid prepolymers with an inherent viscosity of 0.04 to 4.0, which have the formula I

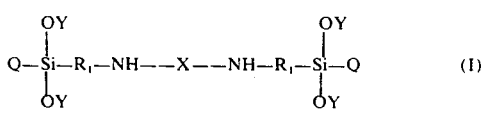

wherein X represents a structural element of the formula II

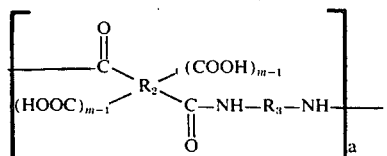

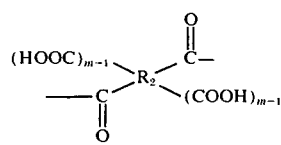

a denotes a number from 0 to 100, and the individual m, $R_1$, $R_2$, $R_3$, Q and Y independently of one another denote the following: m denotes the number 1 or 2, $R_1$ denotes a radical

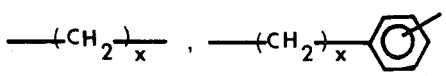

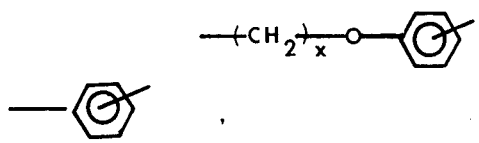

with x denoting a number from 1 to 4, $R_2$ denotes a carbocyclic-aromatic or heterocyclic-aromatic radical, wherein the carbonamide and carboxyl groups are bonded to different ring carbon atoms and the carboxyl groups are each in the ortho-position to a carbonamide group, $R_3$ denotes an aliphatic radical with at least 2 carbon atoms, or a cycloaliphatic, araliphatic, carbocyclic-aromatic or heterocyclic-aromatic radical, Q denotes methyl, phenyl or a -OY radical, with Y having the meaning indicated below, and Y denotes an alkyl radical with 1 to 6 carbon atoms or a phenyl radical, or corresponding cyclised derivatives, to temperatures between 50° and 350°C.

2. Crosslinked polyamides, polyimides or polyamide-imides containing siloxane groups, according to claim 1, which are obtainable by heating silicon-modified prepolymers of the formula I, wherein the individual $R_2$ independently of one another represent an unsubstituted monocyclic, fused polycyclic or non-fused bicyclic aromatic radical, the aromatic mucleii, in the latter case, being bonded to one another via the bridge member —O— or —CO—, the individual $R_3$ independently of one another represent a monocyclic or non-fused bicyclic aromatic radical which is optionally substituted by halogen atoms or alkyl or alkoxy groups with 1–4 carbon atoms each, an unsubstituted monocyclic araliphatic radical or an unsubstituted aliphatic radical with 2–10 carbon atoms, or corresponding cyclised derivatives.

3. Crosslinked polyamides, polyimides or polyamide-imides containing siloxane groups, according to claim 1, which are obtainable by heating silicon-modified prepolymers of the formula I, wherein $R_2$ represents the 1,4- or 1,3-phenylene radical, a benzene ring or the benzophenone ring system and $R_3$ represents the 1,4- or 1,3-phenylene radical, the 4,4'-diphenylyl-ether radical or 4,4'-diphenylylmethane radical, with only one of $R_2$ and $R_3$ denoting a 1,4-phenylene radical, or corresponding cyclised derivatives.

4. Crosslinked polyamides, polyimides or polyamide-imides containing siloxane groups, according to claim 1, which are obtainable by heating silicon-modified prepolymers of the formula I, wherein, if a ≥ 1, the individual $R_2$ and $R_3$ have the same meaning, m is the same for each radical $R_2$, or corresponding cyclised derivatives.

5. Crosslinked polyamide-imides containing siloxane groups, according to claim 1, which are obtainable by heating silicon-modified prepolymers of the formula I, wherein X represents a structural element of the formula IIb

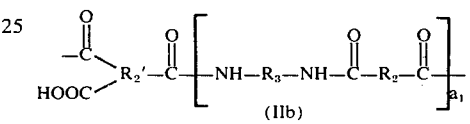

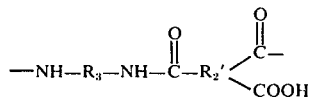

in which $a_1$ denotes a number from 1 to 99 and the two $R_2'$ each represent a benzene ring, with the carbonamide and carboxyl groups being bonded to different ring carbon atoms and the carboxyl groups each being in the ortho-position to the -CO-NH-$R_1$- grouping, and the individual $R_1$, $R_2$, $R_3$, Q and Y are identical, or corresponding derivatives with cyclised terminal carboxylic acid groups.

6. Crosslinked polyamide-imides containing siloxane groups, according to claim 1, which are obtainable by heating silicon-modified prepolymers of the formula I according to claim 1, wherein X represents a structural element of the formula IIc

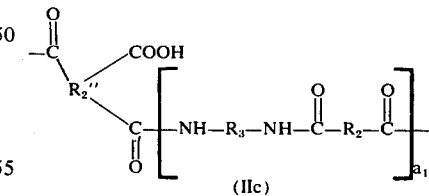

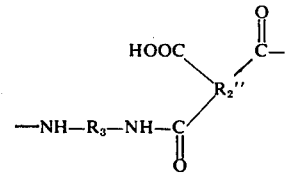

in which $a_1$ denotes a number from 1 to 99 and the two $R_2''$ each denote a benzene ring, with the carbonamide groups and carboxyl groups being bonded to different ring carbon atoms and the carboxyl groups being each in the ortho-position to the -CO-NH-$R_3$- grouping, and the individual $R_1$, $R_2$, $R_3$, Q and Y are identical, or corresponding derivatives with cyclised terminal carboxylic acid groups.

7. Crosslinked polyamide-imides containing siloxane groups, according to claim 5, which are obtainable by heating siliconmodified prepolymers of the formula I, wherein $R_1$ in each denotes a

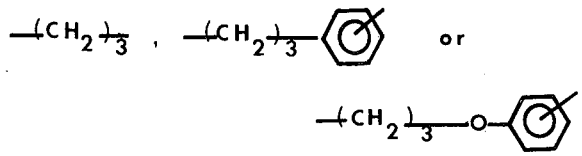

radical, the individual $R_2$ and $R_3$ are identical and one of $R_2$ and $R_3$ represents the 1,4-phenylene radical and the other the 1,3-phenylene radical or $R_2$ and $R_3$ each represent the 1,3-phenylene radical, Q represents the methyl group and Y represents a propyl group or Q represents the ethoxy group and Y represents the ethyl group, or corresponding derivatives with cyclised terminal carboxylic acid groups.

8. Crosslinked polyamides containing siloxane groups, according to claim 1, which are obtainable by heating silicon-modified prepolymers of the formula I according to claim 1, wherein m in each case denotes the number 1, $R_1$ in each case represents a

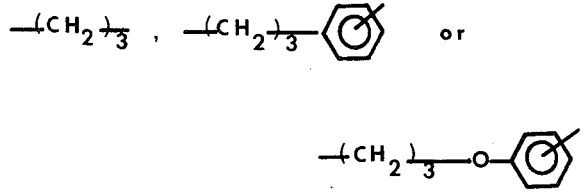

radical, the individual $R_2$ and $R_3$ are identical and one of $R_2$ and $R_3$ represents the 1,4-phenylene radical and the other the 1,3-phenylene radical or $R_2$ and $R_3$ each represent the 1,3-phenylene radical, Q represents the methyl group and Y represents a propyl group or Q represents the ethoxy group and Y represents the ethyl group.

9. Crosslinked polyimides containing siloxane groups, according to claim 1, which are obtainable by heating silicon-modified prepolymers of the formula I, wherein m in each case denotes the number 2, $R_1$ in each case represents a

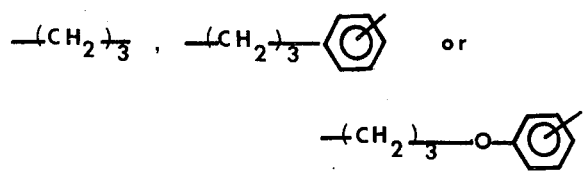

radical, $R_2$ in each case denotes a benzene ring or the benzophenone ring system, $R_3$ in each case denotes the 4,4'-diphenylyl-ether or the 4,4'-diphenylylmethane radical, Q denotes the methyl group and Y denotes a propyl group or Q denotes the ethoxy group and Y denotes the ethyl group, or corresponding cyclised derivatives.

10. Crosslinked polyamide-imides containing siloxane groups, according to claim 1, which are obtainable by heating siliconmodified prepolymers of the formula I, wherein X represents a structural element of the formula IId

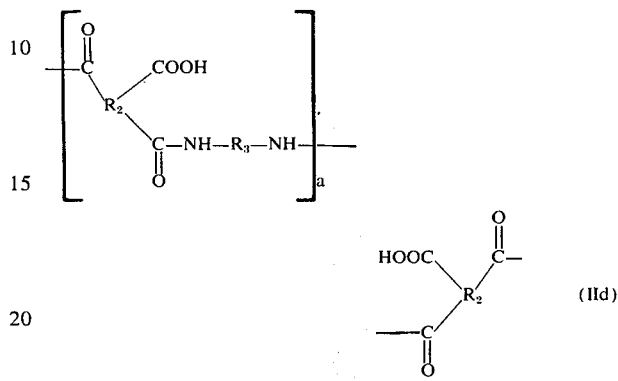

in which $R_1$ in each case represents a

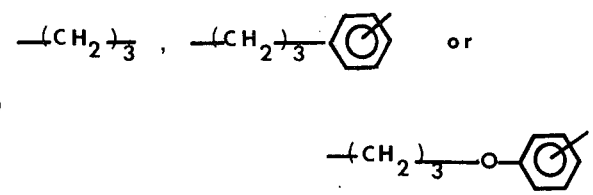

radical, $R_2$ in each case denotes a benzene ring and $R_3$ in each case denotes the 4,4'-diphenylylether or the 4,4'-diphenylylmethane radical, Q denotes the methyl group and Y denotes a propyl group or Q denotes the ethoxy group and Y denotes the ethyl group, or corresponding cyclised derivatives.

11. Crosslinked polyamide-imides containing siloxane groups, according to claim 6, which are obtainable by heating silicon-modified prepolymers of the formula I, wherein $R_1$ in each case represents a

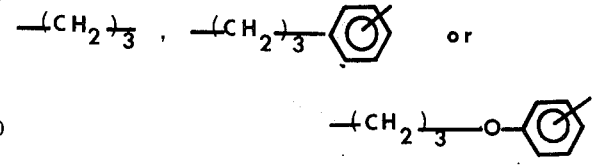

radical, the individual $R_2$ and $R_3$ are respectively identical and one of $R_2$ and $R_3$ denotes the 1,4-phenylene radical and the other the 1,3-phenylene radical, or $R_2$ and $R_3$ each denote the 1,3-phenylene radical, Q denotes the methyl group and Y denotes a propyl group or Q denotes the ethoxy group and Y denotes the ethyl group, or corresponding derivatives with cyclised terminal carboxylic acid groups.

12. Crosslinked polyamides, polyimides or polyamide-imides containing siloxane groups, according to claim 1, which are obtainable by heating to temperatures between 150° and 225°C.

* * * * *